May 13, 1969  K. A. LUTZ  3,444,359
MULTI-STAGE COUNTING APPARATUS HAVING CIRCULATING TIME STORES
Filed Nov. 16, 1965
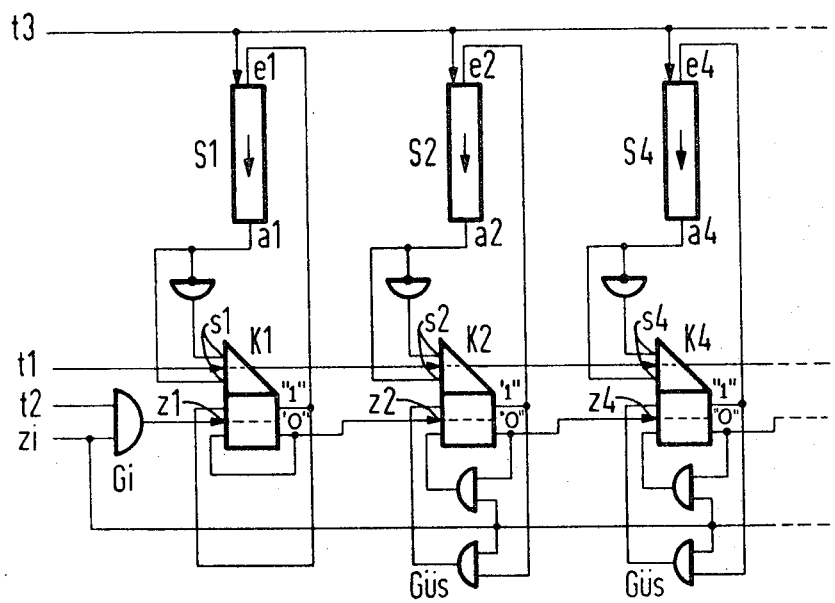
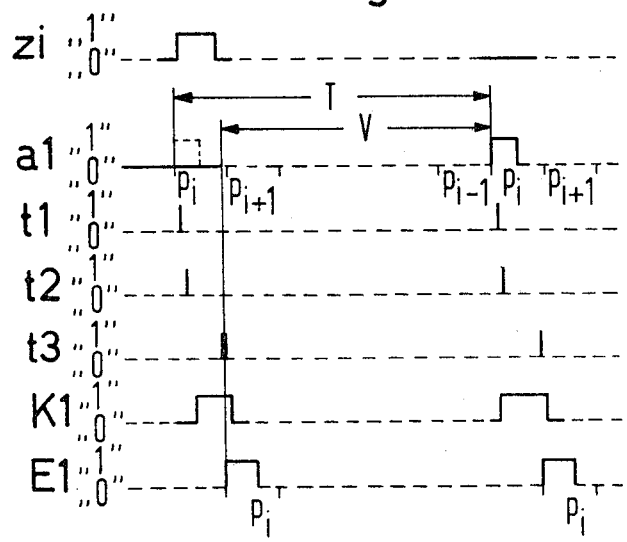

United States Patent Office 3,444,359
Patented May 13, 1969

3,444,359
MULTI-STAGE COUNTING APPARATUS HAVING CIRCULATING TIME STORES
Karl Anton Lutz, Munich-Solln, Germany, assignor to Siemens Aktiengesellschaft, a corporation of Germany
Filed Nov. 16, 1965, Ser. No. 508,122
Int. Cl. G06f 7/385; G06g 7/14
U.S. Cl. 235—92        10 Claims This invention relates to plural stage counting apparatus, and more particularly, to such counting apparatus which employs circulating time stores, such as delay lines, to aid in the counting process. Apparatus of the type above indicated is frequently employed in long distance communication techniques, and more particularly, in message processing apparatus, for the counting of such as dial pulses, or metering pulses for charge purposes. As is known, a counting apparatus of this type, can employ bistable flip-flop stages, particularly of the transistor type which are connected together in a counting chain in frequency divider fashion. In such circuits, the output of one flip-flop stage which may be "up" for instance, in the "0" condition, is capacitively connected with the counting input of the following flip-flop stage. The first flip-flop stage in a counting chain to which the pulses to be counted are conveyed, is generally caused to change condition upon receipt of each pulse, succeeding flip-flop stages then are caused to change in condition only when the immediate preceding stage changes from the "1" into the "0" condition.

It is frequently necessary that pulses of a pulse succession supplied from a plurality of signal sources, and which therefore, are intermixed with each other, be counted by a single apparatus. Such a need exists in a long distance telephone exchange system in which the various connection lines are scanned periodically and successively for reception of dial information appearing in the form of a dual pulse series. In such a system, a signal pulse is provided for each dial pulse and the number of pulses occurring during a known interval of time are counted in order to make possible conversion of the dial information into another form of representation. In such a case, in which time-spaced signal pulses from various sources are intermixed and must be counted by a single counting means, without interference between pulses from the different sources, various prior solutions have been suggested. For instance, in British Patent No. 858,276, there is disclosed a binary counting apparatus having a number of circulation delay line stores, each capable of registering one bit at any instant of time, and circulating this bit with a known circulation period. The output of each delay line is extended to the input of the following delay line, by means of a coincidence gate whose other input is connected back to the input of the first delay line. The gate output is also connected to the cancellation input of another gate which is connected in front of the input of the first-mentioned delay line.

In operation of this prior system disclosed by the British patent, the intermixed pulses which are to be counted are conveyed to the counting apparatus over a single inlet conductor, but the pulses from the same source are spaced from each other in either a predetermined minimum pulse period, or an integral multiple thereof. The delay lines are selected to have circulation periods equal to this minimum pulse period spacing pulses from the same source. The first counting pulse appearing in a certain pulse phase is registered in this phase in the first relay line store so that it appears at the output of this first store to open or unlatch the coincidence gate leading to the second delay line store one pulse period after the first appearance of this pulse. If a second counting pulse appears at this time, or at any integral multiple of the pulse period thereafter, this second pulse reaches the second delay line store over the coincidence gate which is primed by the simultaneous output from the first delay line store. Then, the pulse circulating in the first delay line store is cancelled.

When a third pulse appears in the same phase, it is stored in the first delay line store. When a fourth pulse arrives in the same phase, the previously-mentioned coincidence gate is opened and a further gate extending between the second and third delay line stores is also opened. The result is that the pulses stored in the first and second delay line stores are cancelled, but a pulse is simultaneously stored in the third delay line store. Further additional counting pulses are correspondingly acted upon, depending upon the number of stages in the system.

It will be seen that in this prior British-suggested system, each coincidence necessary to register a pulse in a delay line storage device requires transmission of a pulse from one or more preceding coincidence circuits in the chain. As the number of stages increases, the number of coincidence circuits through which the pulses must pass in order to reach the delay line stores of higher order, also increases, so that the pulses are increasingly subjected to delay. At the same time, it is essential that all pulses originated by counting of signal pulses of the same pulse succession circulate in every one of the delay line storage devices in the same pulse phase. This, however, is impossible at the end of a long chain of coincidence gates, by reason of the cumulative delay provided by the gates. Consequently, with a system of this type, errors are quite likely.

In order to overcome such disadvantages, it has been proposed in British Patent No. 923,326 that the delay line stores associated with stages subsequent to the first stage be provided with additional input circuits so connected as to receive the input pulses in parallel fashion, with the result that each one of the stages is directly provided with the input pulses. In order that each successive pulse will not improperly actuate all of the counting stages, these additional input circuits are provided with a priming connection from the output of the delay line store of the preceding stage, this priming connection operating to open a gate to allow a coincidence input pulse to reach the counting stage. In addition, an erase lead is connected from the input circuit of each stage subsequent to the first stage, back to the preceding stage, in order to cancel the input pulse in the preceding circulating storage device when the coincident gate operates to cause storage of a bit in the same pulse phase in the next delay device.

With this improved circuit arrangement, the disadvantages inherent in the previously-described counting apparatus can be avoided, since the connections essential to the setup for the counting operations can be operated simultaneously, without the delay found in the other case. However, for this purpose, it is necessary to provide different gate circuits between the various counting stages, yet this is inconsistent with the general desire for standardization of circuit components.

The present invention has for its object the provision of a new way to make possible the counting of intermixed pulse successions, in a multi-stage counting apparatus having a number of delay line stores of one bit register capacity.

In the apparatus of the invention, each stage of the counting chain is provided with a bistable flip-flop which has an additional input of the control type, this control input being connected to the output of the corresponding circulating delay line register. The input of this register is connected to the output of the flip-flop of the same stage, but the circulating or access time of the delay line storage device is not equal to the minimum repetition period of the time spaced pulses to be counted, but rather is equal to that time decreased by the time interval between the supply of a control pulse at the control input of the flip-flop and the registration of the corresponding signal element in the same store which directed the pulse to the control inlet.

The system of the invention results in the transient signal elements appearing at the outputs of the delay line stores actuating the corresponding control inlets of the flip-flops to cause registration of those signal elements in static fashion, during the entire time period available for a counting process. The result is that pulses may be transmitted from one stage to another throughout the extent of the counting chain, during the same time period. Consequently, even when the individual signal elements are extremely short as compared with the time interval necessary for transmission of signal elements to a flip-flop stage of higher value or rank, because the greater time period is available in which this transmission can occur, error-less counting is guaranteed.

It will be seen in the counting apparatus of the invention that the flip-flop stages of all ranks may be identical in design. In such system, at the beginning of each pulse phase during which a counting pulse of a particular succession of pulses may appear, the control inlets of the several flip-flop circuits are unlatched or primed by a first synchronizing pulse. Additionally, the gate controlling the counting input of the first flip-flop stage is opened by a second synchronizing pulse for the counting of pulses of the particular pulse succession. Finally, before the start of the next arriving pulse phase, the register inlets of the delay line stores are primed or opened by arrival of a third synchronizing pulse for registration into the circulating delay line registers of the signal elements registered in the bistable flip-flop stages at the end of any given counting process.

The invention will now be more fully described in conjunction with drawings showing a preferred embodiment thereof. In the drawings:

FIG. 1 is a block diagram showing a three-stage counting system in accordance with the invention; and, FIG. 2 is a series of time pulse diagrams used in explaining the operation of the apparatus of FIG. 1.

In the apparatus of FIG. 1, the pulses to be detected and counted are received over a common lead $zi$ and are counted by three counting stages K1, K2, and K4. As indicated by the dashed lines at the right hand of FIG. 1, more counting stages could be included in the system.

The several counting stages are connected together in conventional manner by a capacitive connection such that a pulse delivered at the $z$ inlets ($z1$, $z2$, $z4$) is effective to switch the flip-flop from whatever condition it is in at the moment to the opposite condition. This is indicated by the fact that the $z$ inlets are opposite the dashed lines extending through the square part of the symbol of the flip-flop stage. The connections between the flip-flops of adjacent stages are such that a pulse is delivered to each stage subsequent is the first stage only when the preceding stage goes from its "1" to its "0" condition. That is, the inlet $z2$ is connected to the "0" outlet of the stage K1, etc.

The bistable flip-flop stages themselves are already known and are shown, for example in the Development Reports of Sie mens & Halske AG, 22nd year, 2nd series, pp. 159–167.

In addition to the counting inlets, $z$ . . ., each flip-flop stage K1, K2, K4, has control inlets $s1$, $s2$, $s4$, respectively. These control inlets are connected to the respective outlets $a1$, $a2$, $a4$, of circulation time registers or stores S1, S2, S4. The respective inlets $e1$, $e2$, $e4$ of the circulating time stores are connected to the "1" outlets of the respective flip-flops.

The circulating or access times of the delay line storage devices S1, S2, S4 are selected to be shorter than the minimum separation between pulses of the same pulse succession, with the difference therebetween equal to the time interval between appearance of a signal element at the control inlet of a flip-flop stage and the re-registration of such a signal element in the circulating register or store corresponding to that flip-flop stage.

It is assumed that the apparatus of FIG. 1 is supplied over the line $zi$ with pulses which are time-spaced from each other, and which are intermixed with pulses from various pulse sources. However, it is also assumed that the pulses from any one source are spaced from one another by either a certain minimum time interval, or by an integral multiple of that minimum interval. The result is that pulses from a single source must always appear in the same pulse phase, while pulses from some other source can appear in other pulse phases.

The operation of the apparatus of FIG. 1 will now be partially explained with the aid of the time diagrams shown in FIG. 2.

In the line designated $zi$, a counting pulse appears at a particular pulse phase P$i$ which is to be examined hereinafter. This pulse coincides in time with a synchronizing pulse appearing on line $t2$, and supplied along with the pulses to be counted, to a control gate G$i$. The control gate is of the coincidence, or AND type, so that the pulse appearing on line $zi$ in pulse phase P$i$ is therefore directed to the counting inlet $z1$ of the first flip-flop stage K1. As indicated by the line labeled K1 in FIG. 2, the flip-flop then goes into its "1" condition. There is therefore available at the inlet $e1$ of the circulating delay line store S1, a voltage available for registration. However, each one of the stores S1, S2, S4 must be primed by a pulse on the synchronizing line $t3$ before a pulse from a flip-flop can be stored therein. The synchronizing pulses appear along line $t3$ at the end of each pulse phase to be investigated. In this case, as indicated in FIG. 2, the synchronizing pulse on line $t3$ appears at the end of pulse phase P$i$. At the time, a pulse is inserted in the circulating store S1.

Now, after the circulating or access time V indicated in FIG. 2 has expired, this same signal element previously inserted at the input of the delay line store, appears at the output $a1$ of the store S1. It will be seen from FIG. 2 that this pulse at the output of the store S1 arrives at a time interval T following the beginning of the pulse phase P$i$, which, of course, is the minimum interval between pulses of the same pulse succession. Consequently, the signal element stored in the store S1 appears in the same identical pulse phase as the next possible pulse of the same succession. This "1" pulse at the output $a1$ then changes the flip-flop K1 into the "1" condition, at the same time that a pulse may appear on the line $z1$ to cause a flip of the stage K1 into the "0" condition, to advance the count of the counter.

As indicated, the output $a1$ of the store S1 is also connected to the "0" control inlet through an inverter, so that any "0" pulse (the absence of a stored pulse) in a pulse phase will cause the counter stage to be flipped to the "0" condition. (This change to the "0" condition does not cause advance or flip in the second stage K2, by reason of the absence of a priming pulse on the leads indicated above and below the counting inlet of the second stage, as will be explained more fully hereinafter.)

This transfer from the "1" to the "0" condition of the flip-flop stage K1 is responsible for the change indicated in the line K1 of FIG. 2, following the synchronizing pulse *t*3. That is, the flip-flop remains in the "1" condition only so long as there is no "0" output from the circulating store S1. When such a "0" output arrives, the flip-flop is changed to the "0" condition.

Now when the signal element stored in the store S1 appears at the output $a1$ and a synchronizing pulse is available along line $t1$, the flip-flop K1 is switched again to its "1" position, as indicated in FIG. 2. Then, assuming that there is no pulse along line $zi$ at time $t2$, this signal element is once again registered in the store S1 at time $t3$, to circulate therein and to appear at the output $a1$ at the beginning of th enext P$i$ pulse phase.

These processes repeat themselves each cycle T of the pulse successions, until a new pulse to be counted arrives on line $zi$ in the appropriate pulse phase. When such occurs, the coincidence between the synchronizing pulse on line $t2$ and the pulse to be counted causes a flip of the stage K1 to its "0" condition. At this time the second stage K2 is primed by the same pulse to be counted supplied to coincidence circuit G$us$, and the flip-flop K2 is advanced to its "1" condition. At this time, since the stage K1 is in its "0" condition at synchronizing time $t3$, no new pulse is stored in the store S1. However, a pulse is stored in register S2, in accordance with the same processes as described above, in conjunction with storage of a pulse in register S1.

The gates G$us$, provided for all counting stages subsequent to the first stage, also receive the respective "1" and "0" outputs of the flip-flop counter stages. These circuits operate to require that the flip-flop remain in whatever condition it is in, despite any pulse available on the $z$ line at its counting inlet, unless there is simultaneously available a pulse to be counted on the $zi$ line.

In contrast, the first counting stage K1 is continuously primed as indicated by the connections between the inputs and outputs of the "1" and "0" portions of the flip-flop, without the intervening coincidence circuit.

The operation of the apparatus of FIG. 1 for counting of further pulses in pulse phase P$i$ should be obvious and need not be described. Also, it will be evident that the system will operate in similar fashion to count pulses of different pulse successions, arriving at different pulse phases.

The result of the use of flip-flop stages in which counts can be statically stored, in conjunction with the delay line stores, is that the problems connected with the known circulating delay line register counting apparatus can be avoided, because the time delays to which the switching pulses are subject are no longer important. Indeed, these delays can extend through the entire width of a pulse phase, by reason of the presence of the gates G$us$. These gates, of course, make it unnecessary to reset the flip-flop stages into the "0" condition between two adjacent pulse phases, so that not only is no special switching apparatus necessary to reset the flip-flops, but also the full time span up to the beginning of the next pulse phase is available for the static registration of signal elements which are to be duly included in the counting process.

The invention is not to be considered limited to the embodiment specifically described in conjunction with the drawings, because it will be evident that many minor changes could be made in that apparatus without departure from the scope of the invention. Accordingly, it should be realized that the invention is limited only by the appended claims.

I claim:
1. In a multi-stage counting apparatus for separate counting of time-spaced pulses in which each stage has a circulating pulse store (S1, S2, S4) of 1-bit instantaneous storage capacity, the improvement comprising
 a bistable flip-flop (K1, K2, K4) for each stage connected together in tandem with the counting inlet ($z2$, $z4$) of each stage but the first connected to one of the outlets ("0") of the preceding stage flip-flop, and the counting inlet ($z1$) of the first stage flip-flop supplied with the pulses to be counted, each flip-flop having a control inlet ($s1$, $s2$, $s4$) connected to the outlet of said circulating pulse store, the inlet ($e1$, $e2$, $e4$) of said store being connected to the other inlet ("1") of the flip-flop, each store having a pulse circulating time (V) equal to the minimum pulse succession time (T) of the pulses to be counted together, less the time interval between the appearance of a pulse at the control inlet of the flip-flop and the re-registration of that pulse in the same store, said flip-flop being operable to switch into a first condiiton ("1") with a voltage available at said other outlet ("1") when a pulse is supplied to said control inlet and back to a second condition ("0") when a pulse is coincidentally supplied to its counting inlet.

2. The apparatus of claim 1 in which the circulating pulse stores (S1, S2, S4) are operable to store signal pulses therein only when a first synchronizing pulse ($t3$) and a voltage at said other flip-flop outlet ("1") are simultaneously available,
 and means for supplying said first synchronizing pulses adjacent the end of each pulse phase of pulses to be counted, so that a pulse received in such phase at the counting inlet ($z1$, $z2$, $z4$) of the flip-flop can change the flip-flop to its said second condition ("0") before a first synchronizing pulse ($t3$) arrives to permit storage of pulses in the corresponding stores.

3. The apparatus of claim 2 in which each flip-flop has a second control inlet supplied with the inverted output of the corresponding circulating pulse store, said flip-flop being operable to switch into its said second condition when a pulse is supplied to its second control inlet.

4. The apparatus of claim 3 in which the flip-flop in each stage except the first has a pair of coincidence gates (G$us$) connected between respective outlets and inlets thereof ("0" and "1"), said gates being additionally supplied with the pulses to be counted and operable to prime the flip-flop to permit switching thereof by a pulse supplied to its counting inlet ($z1$, $z2$, $z4$) only when a pulse to be counted is simultaneously available.

5. The apparatus of claim 4 including means for supplying second synchronizing pulses ($t1$) to the control inlets of the flip-flops to prime them to permit switching of each flip-flop by a pulse supplied to its control inlet only when one of said second synchronizing pulses is available, said second synchronizing pulses being supplied at the beginning of a pulse phase of pulses to be counted.

6. The apparatus of claim 3 including means for supplying second synchronizing pulses ($t1$) to the control inlets of the flip-flops to prime them to permit switching of each flip-flop by a pulse supplied to its control inlet only when one of said second synchronizing pulses is available, said second synchronizing pulses being supplied at the beginning of a pulse phase of pulses to be counted.

7. The apparatus of claim 1 in which the flip-flop in each stage except the first has a pair of coincidence gates (G$us$) connected between respective outlets and inlets thereof ("0" and "1"), said gates being additionally supplied wtih the pulses to be counted and operable to prime the flip-flop to permit switching thereof by a pulse supplied to its counting inlet ($z1$, $z2$, $z4$) only when a pulse to be counted is simultaneously available.

8. The apparatus of claim 1 including means for supplying second synchronizing pulses ($t1$) to the control inlets of the flip-flops to prime them to permit switching of each flip-flop by a pulse supplied to its control inlet only when one of said second synchronizing pulses is available, said second synchronizing pulses being supplied at the beginning of a pulse phase of pulses to be counted.

9. The apparatus of claim 8 including a coincidence gate (G$i$) supplied with the pulses to be counted and also with third synchronizing pulses ($t2$) adjacent the beginning of a pulse phase of pulses to be counted, the counting inlet of said first stage flip-flop being connected only with the outlet of said gate.

10. The apparatus of claim 1 including a coincidence gate (Gi) supplied with the pulses to be counted and also with third synchronizing pulses (t2) adjacent the beginning of a pulse phase of pulses to be counted, the counting inlet of said first stage flip-flop being connected only with the outlet of said gate.

References Cited

UNITED STATES PATENTS

| | | | |
|---|---|---|---|
| 2,760,087 | 8/1956 | Felker | 328—56 |
| 3,108,226 | 10/1963 | Douglas. | |
| 3,119,097 | 1/1964 | Tullos | 328—42 |
| 3,381,220 | 4/1968 | Burr | 328—55 |

MAYNARD R. WILBUR, *Primary Examiner.*

GREGORY J. MAIER, *Assistant Examiner.*

U.S. Cl. X.R.

328—42